(12) United States Patent
Smyth et al.

(10) Patent No.: US 7,599,928 B2
(45) Date of Patent: Oct. 6, 2009

(54) INFORMATION RETRIEVAL (75) Inventors: Barry Smyth, County Wicklow (IE);
Evelyn Balfe, County Dublin (IE)

(73) Assignee: University College Dublin National University of Ireland, Dublin, Dublin (IE)

( * ) Notice: Subject to any disclaimer, the term of this patent is extended or adjusted under 35 U.S.C. 154(b) by 235 days.

(21) Appl. No.: 11/334,753

(22) Filed: Jan. 19, 2006

(65) Prior Publication Data
US 2006/0173830 A1  Aug. 3, 2006

Related U.S. Application Data

(63) Continuation of application No. PCT/IE2004/000100, filed on Jul. 23, 2004.

(30) Foreign Application Priority Data

| Jul. 23, 2003 | (IE) | ................................. | 2003/0542 |
| Mar. 22, 2004 | (IE) | ................................. | 2004/0178 |
| Apr. 26, 2004 | (IE) | ................................. | 2004/0289 |

(51) Int. Cl.
*G06F 7/00* (2006.01)
*G06F 17/30* (2006.01)

(52) U.S. Cl. ............................................ 707/5; 707/10

(58) Field of Classification Search ........................ None
See application file for complete search history.

(56) References Cited

U.S. PATENT DOCUMENTS

| 6,006,225 | A  | * | 12/1999 | Bowman et al. ................ 707/5 |
| 6,041,326 | A  | * | 3/2000  | Amro et al. .................... 707/10 |
| 6,078,914 | A  | * | 6/2000  | Redfern ........................... 707/3 |
| 6,078,916 | A  | * | 6/2000  | Culliss ............................. 707/5 |
| 6,169,986 | B1 | * | 1/2001  | Bowman et al. ................ 707/5 |
| 6,275,820 | B1 | * | 8/2001  | Navin-Chandra et al. ...... 707/3 |
| 6,421,675 | B1 |   | 7/2002  | Ryan et al. .................... 707/100 |
| 7,219,073 | B1 | * | 5/2007  | Taylor et al. ................... 705/26 |

(Continued)

FOREIGN PATENT DOCUMENTS

EP   1098258 A1   5/2001

(Continued)

OTHER PUBLICATIONS

Alton-Scheidl et al, Proc Of Erim Workshop . . . , Nov. 28, 1999, pp. 1-12, Select: Social and Collaborative Filtering of Web . . . .

(Continued)

*Primary Examiner*—Jean M Corrielus
*Assistant Examiner*—Aleksandr Kerzhner
(74) *Attorney, Agent, or Firm*—Jacobson Holman PLLC (57) ABSTRACT

A meta search engine receives a query from a user, and submits adapted queries to n search engines. The results are adapted and combined to provide a result set R'. In parallel, the meta search engine accesses a selected hit matrix populated with values for correspondence of queries $q_1$-$q_m$ with web pages $p_i$-$p_n$. These values are the number of "hits" for pervious searches. The pages retrieved from a row for $q_T$ are combined with the search engine results to provide a final result but which is ranked according to previous search experience. The hit matrix may be dynamically selected according to a user community. The query need not exactly match a hit matrix query as rows can be selected according to similarity to the current query $q_T$ with weightings applied.

19 Claims, 5 Drawing Sheets

U.S. PATENT DOCUMENTS 7,225,182 B2 * 5/2007 Paine et al. .................... 707/3

FOREIGN PATENT DOCUMENTS

WO     WO99/56227     11/1999

OTHER PUBLICATIONS

Antworld—A Collaborative Web Search Tool, Feb. 18, 2001, pp. 1-10, Retrieved from the Internet.

Chu et al, Intelligent Information Systems, IIS '97 Proceedings, Dec. 8, 1997, pp. 405-409, Associative query answering via query. . . .

Sanchez et al., "Sinergia: Improving Browsing by Exploiting Community Knowledge," Online Mar. 22, 2001.

Zhang et al. "A novel Web usage mining approach fro search engines," Computer Networks 39 (2002) p. 303-310.

Hansen et al., "Using navigation data to improve IR functions in the context of Web search," Proceedings of the 2001 ACM CIKM $10^{th}$ International Conference on Information and Knowledge Management, Atlanta, GA, Nov. 5-10, 2001.

* cited by examiner

Fig. 4(a) Overall Accuracy

Fig. 4(b) Average number of cases

Fig. 5(a) Precision

Fig. 5(b) Recall

INFORMATION RETRIEVAL

This is a continuation of PCT/IE2004/000100 filed 23 Jul. 2004 and published in English.

BACKGROUND OF THE INVENTION

The invention relates to retrieval of information from databases and servers.

Today, Web search engines are critical components of the Internet infrastructure that drives the information economy. It is believed that every day approximately 60 terabytes of new content is added to the World-Wide Web. Unfortunately, a significant portion of searchers are frustrated and disappointed by the performance of search engines when it comes to their ability to deliver the right result at the right time. One important reason for this is that the information retrieval techniques that form the core of Web search engines are not so well suited to the reality of Web search. This may be because many of these techniques were originally developed for specialised search tasks by expert users, over limited document collections. As a result, these shortcomings lead to the following inter-related problems:

The Coverage Problem: the continued growth of the Web means that no single search engine can hope to provide complete coverage.

The Indexing Problem: the heterogeneous nature of Web documents and the lack of any reliable quality control make indexing extremely difficult.

The Ranking Problem: ranking results on the basis of weighted overlaps with query terms has proven to be unsatisfactory in Web search.

The Query Problem: the preponderance of poorly formed, vague queries means that most searches are under-specified to begin with.

Recent years have seen a number of key developments in Web search, many of which take specific advantage of the unique characteristics of the Web, and the particular way that Web users search for information. For instance, researchers recognised the advantages of combining the results of many individual search engines in a meta-search engine to achieve improved coverage and accuracy. More recently, information about the Web's topology (the connectivity of individual pages) has been incorporated into search engines as a way to recognise and rank authoritative pages. Others have looked at how clustering techniques can be used to organise a flat list of results into a more structured collection of topical clusters. While this does not solve the query problem, it at least helps the search engine to separate out the different meanings of a vague query into collections of topically related results.

That these developments have all tended to adopt a traditional information retrieval perspective in the sense that they seek to improve the manner in which documents are represented, retrieved or ranked, with focusing at the level of an individual search session.

The invention is directed towards reducing the number of iterations required for information retrieval.

SUMMARY OF INVENTION

According to the invention there is provided a meta search engine for receiving user search queries, submitting corresponding queries to search engines and receiving their responses, and for post-processing the search engine responses to provide a ranked user response list, wherein the meta search engine ranks the engine responses according to historical data indicating history of correspondence between user queries and response selections.

In one embodiment, the correspondence is stored as a matrix having historical hit numbers for query-selection pairs.

In another embodiment, there is a plurality of matrices, and the meta search engine dynamically selects a matrix.

In a further embodiment, the meta search engine dynamically selects a matrix according to a community to which the user is allocated.

In one embodiment, the community is determined according to source of a query.

In another embodiment, a Web site from which a query originates is used to identify a community.

In a further embodiment, a log-in procedure of a user is used to determine a hit matrix.

In one embodiment, the engine uses a plurality of hit matrices, and firstly presents results arising from use of a primary matrix.

In another embodiment, the results are presented together with information about the communities associated with the matrices.

In a further embodiment, the results are presented in usage-based clusters.

In one embodiment, the engine uses a plurality of matrices and it automatically determines which matrix is likely to be the most relevant.

In another embodiment, the engine computes a success score derived from the relative number of selections for the query compared to the total number of selections of the matrix.

In a further embodiment, the meta search engine determines historical selection values for a direct match of a user query.

In one embodiment, the meta search engine determines historical selection values for a plurality of previous queries, which are related to the current query.

In another embodiment, weightings are applied to the selection values according to similarity of the associated query to the current query.

In a further embodiment, the similarity is determined according to extent of query word overlap.

In one embodiment, one dimension of a matrix relates to queries, and a weighting is applied to each row or column for that dimension.

In another embodiment, the historical data is anonymous as regards particular users, thus ensuring privacy.

In a further embodiment, the engine modifies the historical data according to a parameter.

In one embodiment, the parameter is time, older historical data having less relevance than newer historical data.

In another embodiment, the engine combines a determined relevancy score with another score.

In a further embodiment, the other score is a sponsored listing ranking.

In one embodiment, the engine comprises a case based reasoning system in which each query and its historical selection data is a case.

In another embodiment, each case comprises a query and k result pairs, each pair having a response identifier and a relevance score.

In a further embodiment, each case corresponds to a query dimension of a hit matrix.

In another aspect there is provided a computer program product comprising a computer readable medium comprising software code for implementing operations of a meta search engine as described above when executing on a digital computer.

BRIEF DESCRIPTION OF THE DRAWINGS

The invention will be more clearly understood from the following description of some embodiments thereof, given by way of example only with reference to the accompanying drawings in which:—

DETAILED DESCRIPTION OF THE INVENTION

Figure 1:
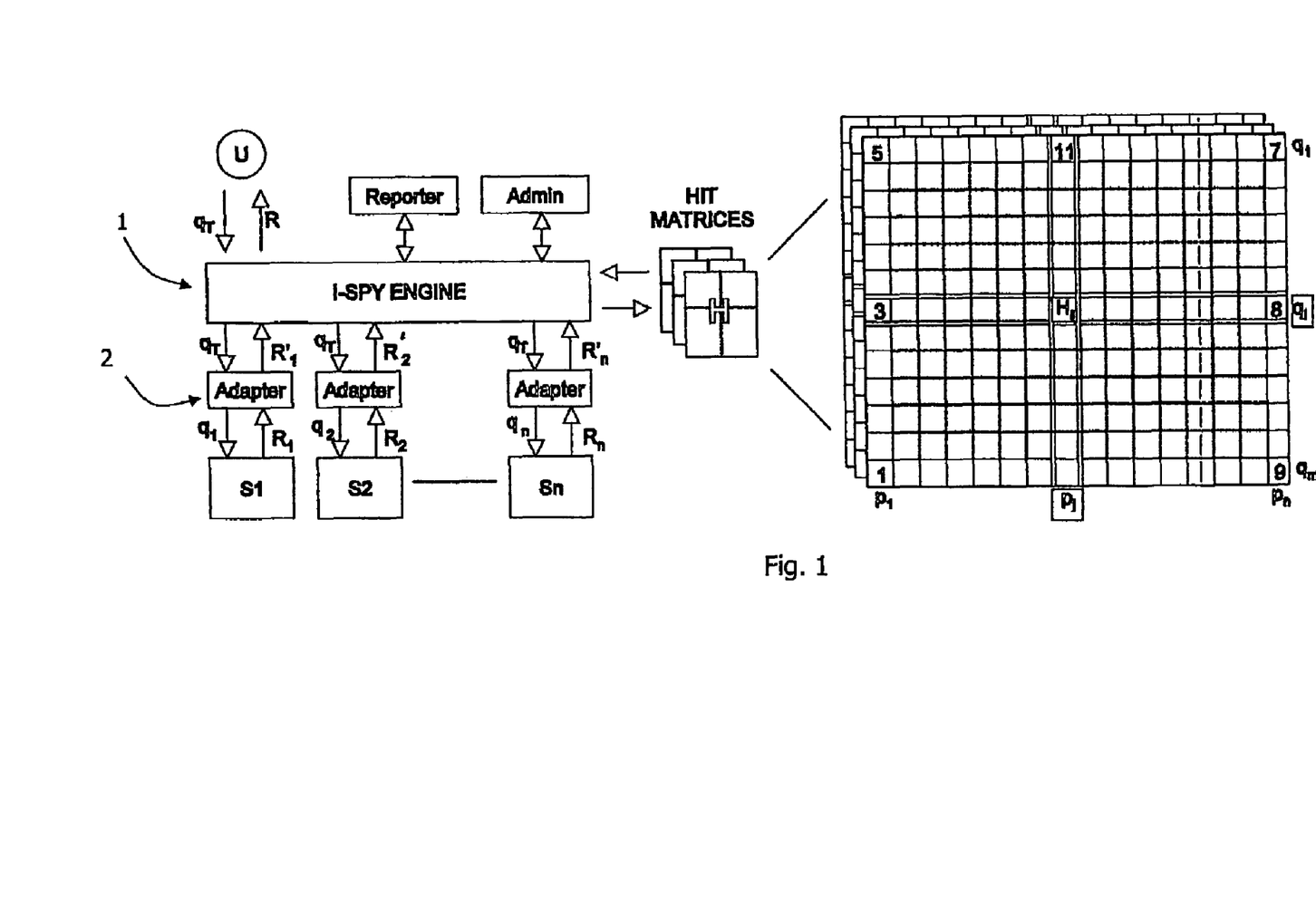
FIG. 1 is a diagram showing a meta search engine of the invention and components to which it is connected.
Figure 2:
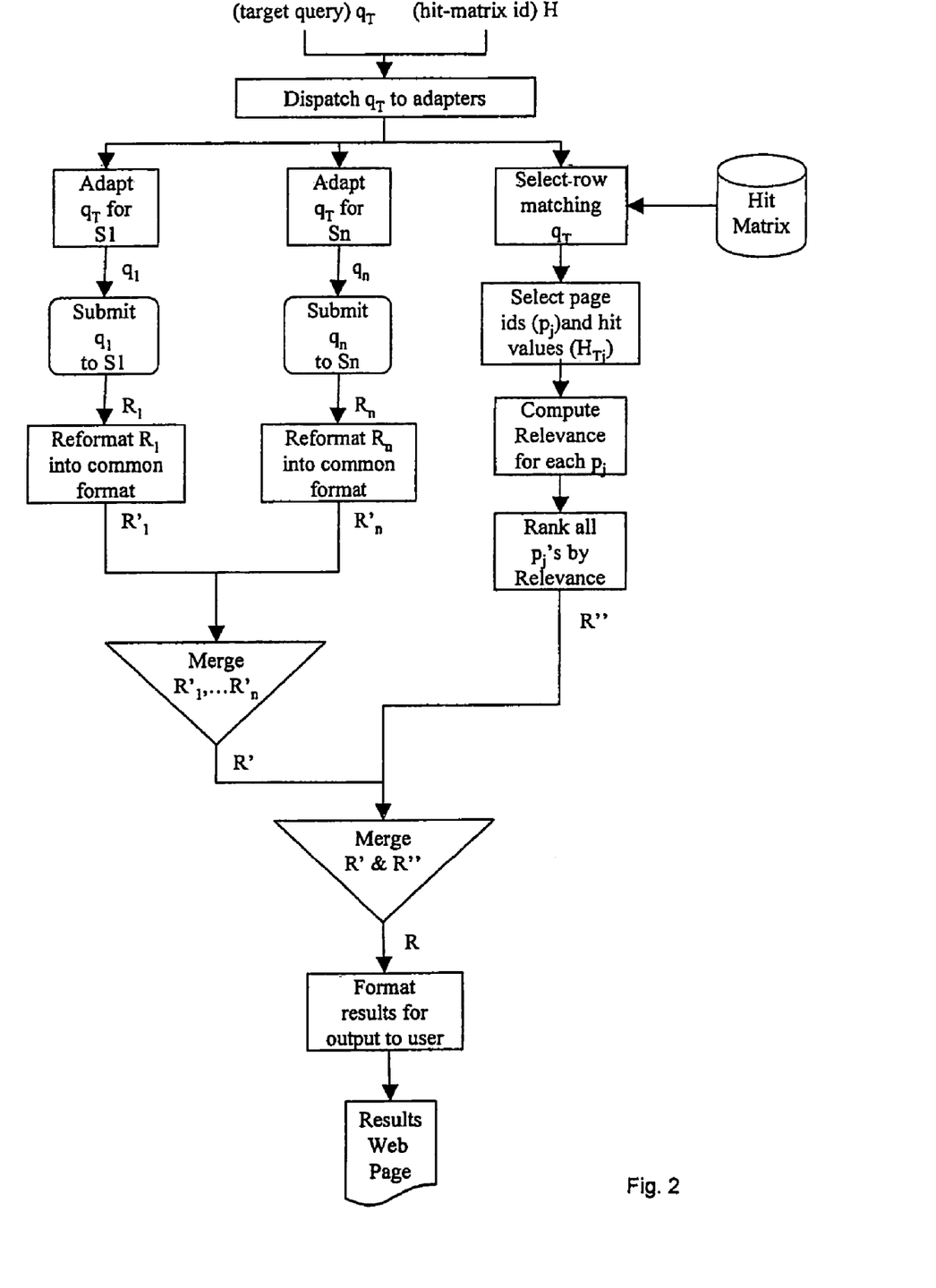
FIG. 2 is a flow-chart describing the operation of the meta engine in one embodiment.

Referring to FIGS. 1 and 2 a meta search engine 1 receives query $q_T$ from a user U and transmits responses R. To do so it submits the query $q_T$ to up to n search engines $S_n$ via adapters 2. Each of these underlying search engines already exists as a stand-alone search system. In one example they are generic search engines or alternatively they may be more specialised search engines.

Each adapter 2 transforms a user's query $q_T$ into the format of the associated search engine. For example, $q_T$ is transformed into $q_1$ for search engine $S_1$: Typically, this may involve reformatting the user query so that it corresponds to the input format required by the search engine in question. Once reformatted, the transformed query is input into the appropriate search engine, which then generates its own result list $R_n$. For example, search engine $S_1$ produces result list $R_1$.

Next, each of the result-lists $R_1$-$R_n$ produced by the underlying search engines are transformed by the adapters 2 into a common format by identifying their common components (page title, page URL, snippet text, etc). A standard XML representation is used to provide this common format.

Once each of the result-lists $R_1$-$R_n$ produced by the underlying search engines have been reformatted they are merged by the meta engine 1 to produce a combined result-list, R'. Each unique result is scored according to how high it appears in a result-lists ranking and according to how many result-list it appears in. Results with better than average ranking scores (those that appear high up in many result lists) are ranked highly in the merged result-list. If a given result does not appear in the result-list of some underlying search engine then it is penalised with a poor score, that is calculated to be 1 plus the length of the result-list from this search engine. In this way the merged result R' list contains a list of all of the results returned by the combination of underlying search engines. These results are ranked in such a way as to give preference to results that are consistently ranked high by many of the underlying search engines.

At this point the result list, R', is equivalent to the type of results that are returned by many already existing meta-search engine technologies. However, the invention involves an additional processing stage in order to promote certain results within the result-list.

The meta engine 1 post-processes the responses R' using hit matrices H, having in one dimension Web pages and in the other query strings. Each cell of a hit-matrix indicates the number of times a particular page has been previously selected for a particular query. Accordingly, each time a result list is presented to a user, in response to some query, q, and each time a user selects a result page, p, from said result list, the hit-matrix is updated by incrementing the counter at co-ordinates corresponding to q & p. The hit-matrix is implemented as a memory device that can be accessed via its query-page co-ordinates.

The meta engine 1 implements an approach to Web search that we refer to as collaborative search because of the way in which it takes advantage of the search histories of users, preferably a community of like-minded users. The engine 1 operates in the mode of a meta-search engine or result post-processor, combining the results of underlying search engines as shown in FIG. 1.

Relevance Score

The hit-matrix (H) memory store is a record of the results selected in past search sessions. Each time a user selects page $p_j$ for query $q_i$ the value of $H_{ij}$ is incremented. Thus, $H_{ij}$ can be viewed as the number of times that $p_j$ has been selected as a result for query $q_i$. The row of H that corresponds to query $q_i$, provides a complete account of the relative number of all page selections for this query over all search sessions that have used this query.

In addition to the result generation process described above—where the results from underlying search engines are merged—, the engine 1 also generates a second result-list, R", this one made up of all those pages from the hit-matrix row, corresponding to $q_T$, the current target query, that have a non-zero value. These result pages have been previously selected by some users for the query $q_T$. Clearly, if $q_T$ has never before occurred then this second result-list will be empty. Assuming it is not empty, however, the results are scored according to the relevance metric shown in Equation 1 below. This metric computes the number of selections received by a page $p_j$ for the query $q_T$, relative to the total number of page selections that have occurred for $q_T$. For example, a relevance of 0.4 for $p_j$ and $q_T$ means that 40% of the page selections from result-lists for $q_T$ have been for this page, $p_j$. A major advantage of the engine 1 is the ability to exploit the hit-matrix H as a direct source of relevancy information. The hit-matrix entries provide relevancy metrics of query-page mappings. It will be appreciated from FIG. 2 that the relevancy processing is carried out in parallel with the submission of queries and retrieval of results from the underlying search engines S1-Sn.

The meta engine 1 queries all of the underlying search engines S1-Sn in parallel by means of separate simultaneous processes. The overall search time is dictated by the time taken by each standard search engine S1-S1 to return their results. Local processing time is insignificant in comparison to the time taken for the underlying search engines to return their results. So, by the time that the search engines have returned their results, all hit-matrix processing has been preformed and the only outstanding task for I-SPY is to merge the two sets of results. This task is performed very efficiently.

$$\text{Relevance}(p_j, q_T) = \frac{H_{Tj}}{\sum_{\forall j} H_{Tj}} \quad (1)$$

The result pages contained in R" are ranked according to their relative selection frequencies, based on past search sessions and these results take priority over the results in the merged-result list R'. Thus, in the final step of the search process the two result lists, R" and R' are merged such that the R" results appear first, followed by the results from R'. As part of this merging process, in the case where a result is contained in both R" and R' then it is removed from R' so that in the final presentation of the final results this result does not appear twice.

Collaborative Search.

The engine 1 can be configured to use different hit-matrix memory devices in the service of different queries. In one embodiment, each hit-matrix is populated with queries and selections from a community of users operating within a specific domain of interest. The engine 1 offers different communities of users access to a search service that is adapted for their query-space and its preferred pages. For example, a motoring Web site might configure a hit-matrix for its users. The meta engine 1 facilitates this through a simple forms interface and in doing so, provides the Web site with access to a search interface that is associated with this new hit-matrix. Through this interface a user can define a search service for their own community of users and can offer this search service to their users in a variety of ways; for example, by incorporating it into their own web site. As a result a unique hit-matrix H is created and associated with this community of users. For example, if the new search service is offered through a particular Web site then as visitors to this site use its search service, their queries and page selections will populate the associated hit-matrix and the engine 1, using its ranking metric, will help to disambiguate vague queries by promoting previously preferred pages for repeated queries. For instance, the query 'jaguar', submitted through a motoring Web site that has been configured to use a unique hit-matrix, is likely to result in the prioritisation of pages related to the car manufacturer rather than sites related to wildlife. Previous searches for this term are far more likely to result in the selection of these car pages since the users will have been searching from a motoring Web site.

Figure 3:
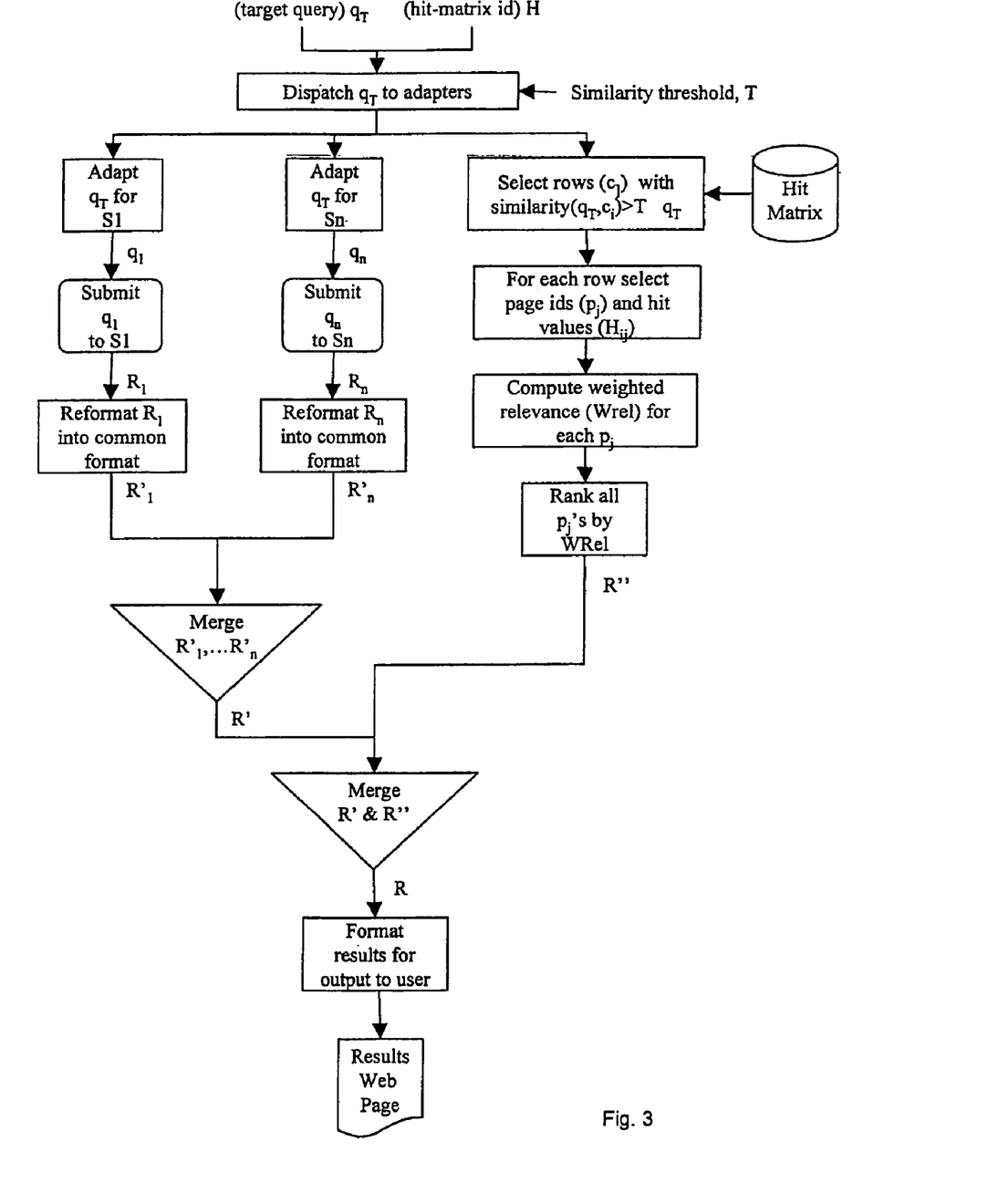
FIG. 3 is a flow chart showing operation of the meta engine in another embodiment.

Similarity-Based Query Reuse (FIG. 3)

It is noted that in this embodiment, as well as the other embodiments, the selection of the hit matrix is based on the community to which the user is allocated (which in turn may be determined according to the source of a query, for example, the Web site from which a query originates) or the user's log-in procedure; but that that the historical data in each hit matrix is anonymous as regards particular users. Because of this anonymity, the meta search engine's relevancy searching is performed without regard to the identity of the user making the search query; and users' privacy is ensured.

The process so far described relies on exact matches between the current query and past search sessions. In other words, the result list, R", generated from a given hit matrix depends on there being an exact match for the current query in this hit matrix. This depends on query repetition, that search users use the same queries on a frequent basis. In some search scenarios exact query repetition may be rare and this will mean that for most queries the engine 1 will not be able to contribute the new and improved results R". For example suppose the current query is for "jaguar photos". Unless this query has been submitted in the past, and unless users selected results returned by this query, there will be no entry in the hit-matrix. For instance, the query, "jaguar pictures" may have occurred in the past but because it is not an exact match for "jaguar photos" its hit-matrix entries will not be retrieved even though they may be relevant to the new query. For this reason, in another embodiment the meta engine has a more flexible approach to using hit-matrix memory structures that does not rely on exact match queries, one that can leverage similar queries.

In this embodiment, the meta engine performs case based reasoning in which each row of the hit-matrix H is an individual case or, equivalently, a k+1-tuple made up of the query component (a set of query terms) plus k result-pairs, each with a page id and an associated relevance value computed from the hit-matrix (see Equation 2). The problem specification part of the case (see Equation 3) corresponds to the query terms. The solution part of the case (see Equation 4) corresponds to the result-pairs; that is, the set of page selections that have been accumulated as a result of past uses of the corresponding query. The target problem is, of course, represented by the target query terms.

$$c_i = (q_i, (p_1, r_1), \ldots, (p_k, r_k)) \quad (2)$$

$$\mathrm{Spec}(c_i) = q_i \quad (3)$$

$$\mathrm{Sol}(c_i) = ((p_1, r_1), \ldots, (p_k, r_k)) \quad (4)$$

$$\mathrm{Rel}(p_j, c_i) = r_j \text{ if } (p_j, r_j) \in \mathrm{Sol}(c_i); = 0, \text{ otherwise.} \quad (5)$$

Case similarity, means being able to measure query-query similarity, and a metric is the simple term overlap metric shown in Equation 6. During the retrieval stage, it allows the case-based system of the engine 1 to rank-order past search cases according to their similarity to the target query so that all, or a subset of, the similar cases might be reused during result ranking. This overlap is just one type of similarity metric, and the engine 1 could alternatively implement a variety of different types. For example, another way to measure query similarity is to compute the correlation between the hit values of those pages that the two queries have in common. If these hit values are highly correlated then the same pages are being selected in the same relative proportions and so the engine 1 can regard them as similar. Alternatively the engine 1 might combine the overlap metric and the correlation metric. The point is that there are possible replacements for the similarity metric shown.

$$\mathrm{Sim}(q_T, c_i) = \frac{|q_T \cap \mathrm{Spec}(c_i)|}{|q_T \cup \mathrm{Spec}(c_i)|} \quad (6)$$

Now instead of retrieving the hit-matrix entries for a given query $q_T$—by selecting the entries for the row that corresponds to $q_T$—the engine 1 identifies all hit-matrix rows whose query components are considered to be sufficiently similar to qt by setting a minimum similarity threshold, for example. If multiple similar cases (hit matrix-rows) are available for a target query, then there are multiple search histories (case solutions) to inform the new result ranking. The same page may recur in multiple case solutions, each with a different relevance value. For example, the page www.sun.com may have a high relevance value (let's say, 0.8) for a past query 'Java language' but it may have a lower relevance for another past query 'java' (let's say 0.33). The question is: how can these relevance values be combined to produce a single relevance score for this page relative to the target query, 'Java inventor'? The engine 1 computes a normalised weighted relevance metric that combines individual relevance scores for individual page-query combinations. This is achieved using the weighted sum of the individual relevance scores, such that each score is weighted by the similarity of its corresponding query to the target query. Thus, in our example above, the relevance of the page www.sun.com is 0.516: the sum of 0.264 (that is, 0.8 page relevance to query 'java language' multiplied by the 0.33 query similarity between this query and the target, 'java inventor') and 0.165 (0.33*0.5 for the past query, 'java'), divided by 0.83, the sum of the query similarities. Equation 7 provides the details of this weighted relevance metric with respect to a page $p_j$, a target query $q_T$, and a set of retrieved similar cases $c_1, \ldots, c_n$. Exists($p_j,c_i$) is simply a flag that is set to 1 when pi is one of the result pages represented in the solution of case $c_i$, and Rel($p_j,c_i$) is the relevance score for $p_j$ in $c_i$ (see 5 and as computed by Equation 5).

$$WRel(p_j, q_T, c_1, \ldots, c_n) = \frac{\sum_{i=1\ldots n} Rel(p_j, c_i) \cdot Sim(q_T, c_i))}{\sum_{i=1\ldots n} Exists(p_j, c_i) \cdot Sim(q_T, c_i))} \quad (7)$$

Threshold

As mentioned above, during retrieval the engine must select a set of cases (past search histories) that are related to the current query, $q_T$, by virtue of the similarity between the current query and the queries associated with these cases. The engine is configured to allow for different levels of admissible query similarities. Thus, the engine may threshold retrieval so that only the best matching cases are selected, rather than all cases with a non-zero similarity to the target query. Limiting retrieval to cases with a query similarity above 0.5 would prevent the retrieval of unrelated queries. This may, however, prevent the retrieval of some appropriate cases with low query similarity. For example, the 0.5 similarity threshold would prevent the relevant 'java language' case from being retrieved. Regardless, the hope is that such spurious query matches, while they will inevitably occur, will be infrequent and diluted by more numerous appropriate matches. This degree of configurability makes it possible to adapt the engine for different retrieval environments. In those environments where query repetition is commonplace a higher similarity threshold may be more preferable to limit retrieval to the reuse of past retrieval sessions that are more reliable examples of similar retrieval. However, if query repetition tends to be low then it may be necessary to reduce the similarity threshold even at the risk of reusing past retrieval histories that may not be fully relevant.

Thus, in summary, the exact-match retrieval aspect of the engine has been extended so that it can reuse the past search histories of a range of queries that are similar to the current target query. This means that during each search session the engine may select multiple rows from the hit-matrix—each row corresponding to the search history for a similar query—and may combine the pages that were selected in these multiple rows using the weighted relevance metric defined above. Accordingly, pages that are frequently selected for many similar queries are given priority.

A flow-chart for the above embodiment is presented in FIG. 3. The meta search component is as in FIG. 2 but it is clear that the hit-matrix processing is now related to multiple hit-matrix rows. The production of a final result list to return to the user is as before—the hit matrix results, R", are merged with the meta-search results, R', such that the hit matrix results are given priority. The similarity and weighting computations are in parallel to the relevancy communication with the search engines S1-Sn.

It is worth noting that while the primary advantage of the procedure for reusing similar queries allows the engine to influence a great range of search sessions—on the assumption that similar queries are more likely to occur than exact duplicates—a secondary advantage also exists. Specifically, by reusing the past selections of the search histories corresponding to similar queries, the engine 1 can now add pages to the result list R" that may not occur in the results returned by the underlying search engines for the current target query. These new pages may very well be relevant for the target query—after all they were selected for similar queries in the past, by definition—but for various reasons they may not have been located by the underlying search engines. For example, they may not contain all of the terms in the current target query. The result is that the relevance of the result lists produced by the meta engine 1 may contain many more relevant pages that any of the lists produced by the underlying search engines, either individually or in combination.

Evaluation

An evaluation was performed during a first live-user experiment that involved 92 computer science students. The experiment was designed to evaluate the benefits of the engine 1, relative to a standard meta-search engine, in the context of a fact-finding or question-answering exercise. To frame the search task, we developed a set of 25 general knowledge AI and computer science questions, each requiring the student to find out a particular fact (time, place, person's name, system name etc.).

For this first experiment, the engine 1 had the following functionality.

The students were randomly divided into two groups. Group 1 contained 45 students and Group 2 contained the remaining 47. Group 1 served as the training group for the engine of the invention, in the sense that their search histories were used to populate the hit-matrix but no re-ranking occurred for their search results. This group also served as a control against which to judge the search behaviour of the second group of users, who served as the test group. In total the Group 1 users produced 1049 individual queries and selected a combined total of 1046 pages, while the Group 2 users used 1705 queries and selected 1624 pages.

In summary, the data from the first live-user experiment provides the following information to form the basis of our current evaluation: the queries submitted by each user; the pages that they selected from the subsequent result-lists; the position of these pages within the result-list; the pages where they located a correct answer to a particular question; and the hit-matrix produced by the Group 1 users. From this data a case-base (essentially the Group 1 hit-matrix) was built, a set of test problems (the Group 2 queries), and a set of correct solutions to these problems (the pages that are known to contain the correct answer to a particular question).

Then we carried out a second experiment by responding to Group 2 queries with the new result-lists that are recommended by a case-based version of the engine 1, and we evaluated the quality of these result-lists with reference to our known set of correct pages, comparing the outcome to the version of the engine 1 for the first experiment and meta-search performance results. We evaluate 5 different variations of the engine, each with a different minimum similarity threshold (0, 0.25, 0.5, 0.75, 1) during case retrieval to limit the range of retrieval cases.

Perhaps the most basic measure of search engine accuracy concerns its ability to return a single relevant result in its result-list. However, we also consider more refined measures that focus on the number of relevant results and their positions. To measure the overall accuracy for each search engine (CB, I-SPY and Meta), we compare each of the full result-lists returned by these search engines (including the 5 CB variations), for the 1705 test queries, to the list of known correct results associated with these queries. We compute the percentage of result-lists that contain at least one correct result.

Figures 4A, 4B:
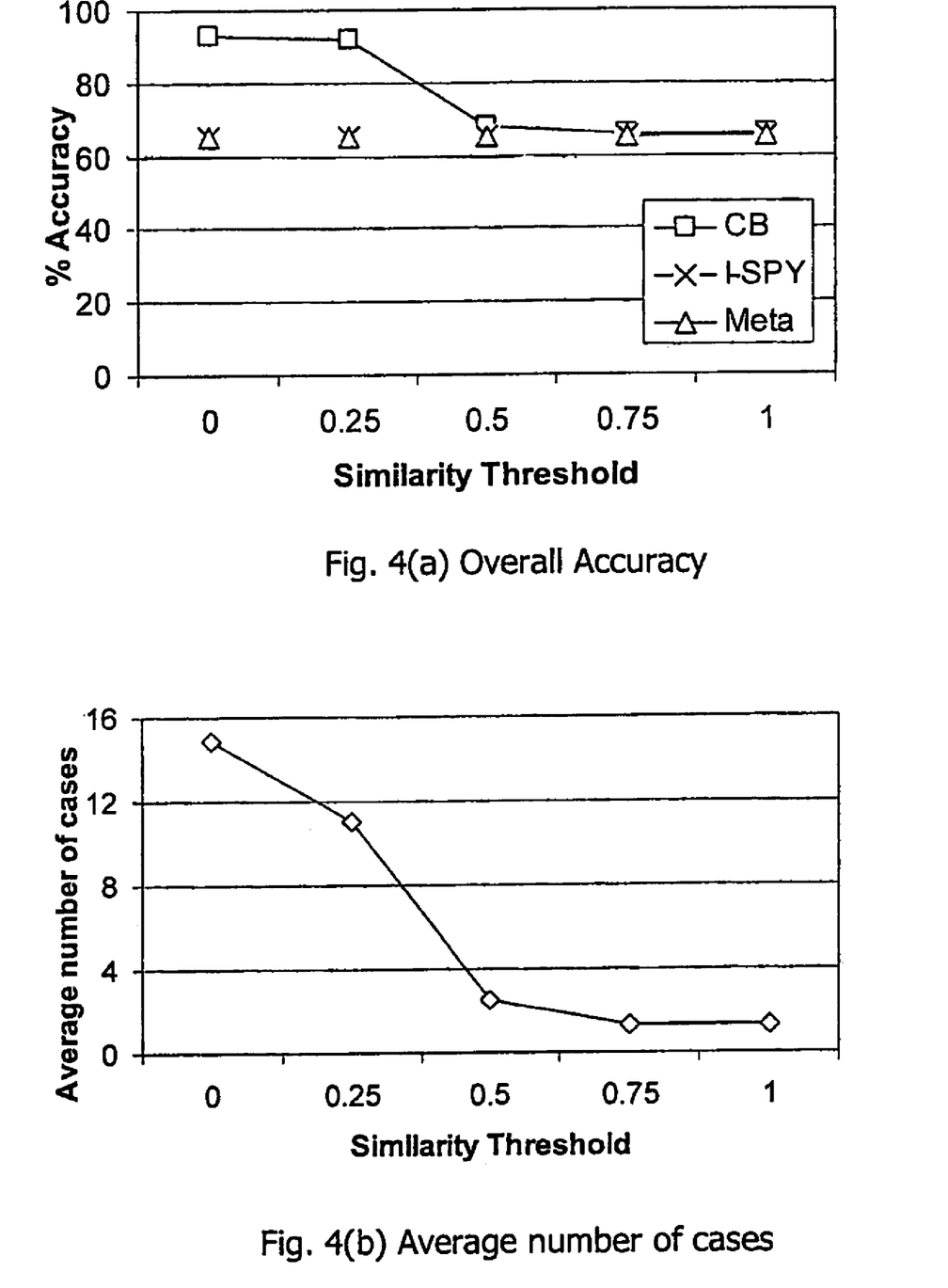
FIG. 4(a), 4(b), 5(a) and 5(b) are plots illustrating meta engine performance.

The results are presented in FIG. 4(a) as a graph of overall accuracy against similarity threshold. Each plot corresponds to a single search engine. The plots for I-SPY and Meta remain flat at 65%; they are unaffected by variations in the CB similarity threshold. The results clearly show the accuracy benefits of the case-based method: at a similarity threshold>0, it returns a correct result page in 93% of sessions, and in 92% of sessions with the similarity threshold>0.25. This is a relative improvement of 43% over I-SPY and Meta for CB. The benefit here is derived from the fact that CB is able to include additional pages beyond those found by the underlying search engines in the result-lists returned for a given query. These additional results come from the result-lists contained within the similar cases. In contrast, Meta and I-SPY are effectively limited to those results returned by the underlying-search engines; I-SPY simply-reorders the Meta-results using its relevance metric. The CB benefit proves that CB's additional pages are frequently relevant to the target query.

It is interesting to note how the CB accuracy drops off sharply with increasing similarity threshold. From a purely CBR perspective this appears strange at first glance. Increasing the similarity threshold will improve the average similarity of the cases being retrieved and we are conditioned to expect that this is likely to improve any 'solution' that is derived from these cases. Not so in our case-based view of search however, because the number of cases retrieved and the diversity of the results, is likely to be important. When we plot the average number of similar cases retrieved, for a typical query, across the different similarity thresholds (see FIG. 4(b)) we can see that there is a sharp drop in cases between the 0.25 and 0.5 thresholds. At the 0 and 0.25 thresholds, 15 and 11 cases, respectively, are being retrieved for a target query, but this falls off to 2.5 for the 0.5 threshold and then 1.3 cases beyond this. At the higher thresholds there are simply not enough similar cases to make a meaningful additional contribution to the result-lists offered by the meta-search and so the benefits enjoyed by CB are fractional. So, even though low similarity thresholds may permit the reuse of unrelated search sessions (e.g., 'inventor java' would be considered similar to 'inventor ethernet'), we find that the benefits of a greater number and variety of reusable cases easily outweighs any problems due to inappropriate retrievals, which our weighted relevance metric will tend to discount anyway.

The standard objective test of search engine accuracy is the precision and recall test: the former computes the percentage of returned results that are relevant while the latter computes the percentage of relevant results that are returned. We measure the percentage precision and recall values for each of the techniques under review for different result-list sizes (k=5 to 30).

Figure 5A:
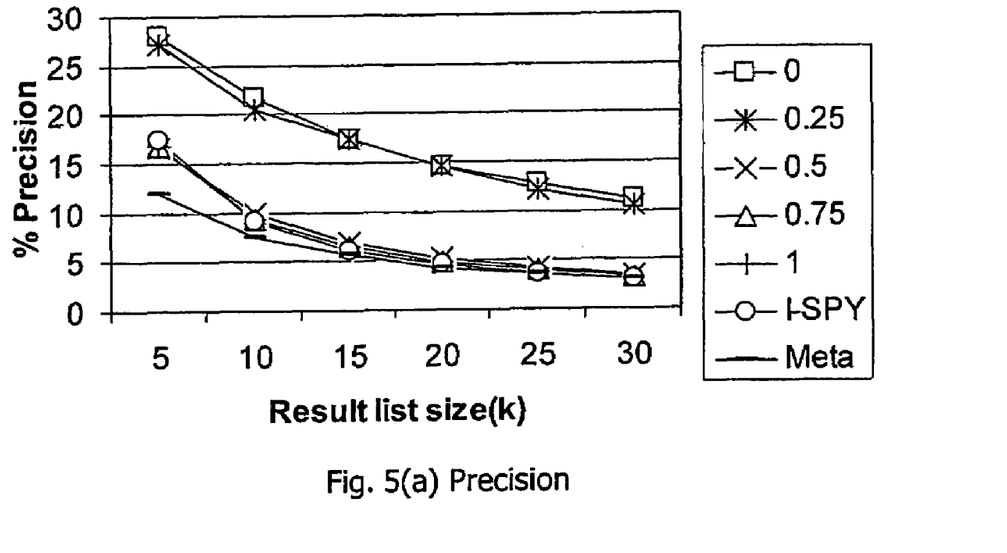
Figure 5B:
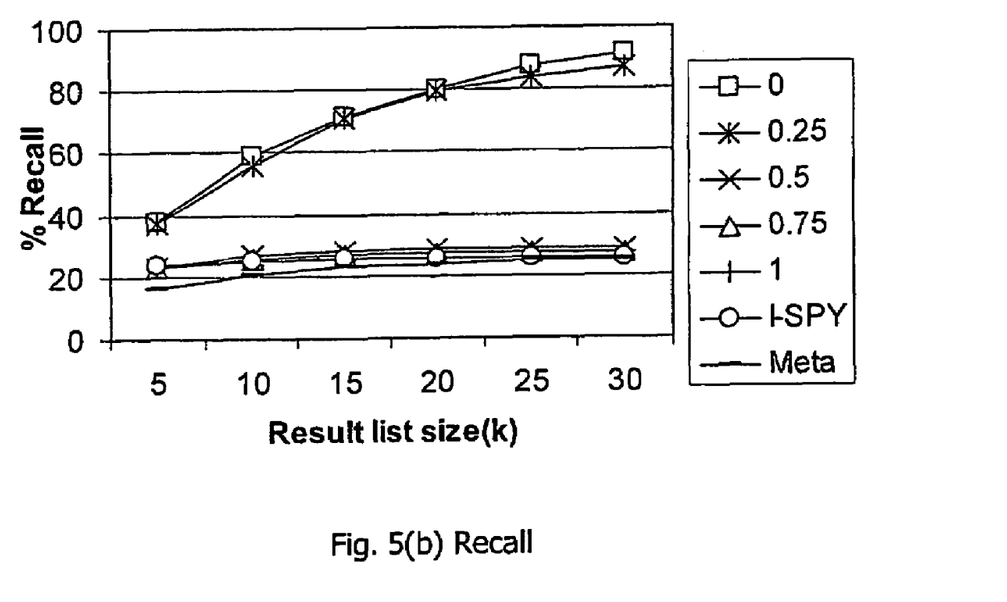

The results are presented as precision and recall graphs, for each of the four similarity thresholds, in FIG. 5(a&b). Each graph presents the precision (or recall) plot for the 5 variations of CB, along with I-SPY and Meta, for different sizes of result-lists, k. As expected we find that precision tends to fall-off with increasing result-list sizes; typically the number of relevant results is much less than k, and the majority of these relevant results should be positioned near the top of result-lists. The critical point is that, once again the performance benefits due to the case-based approach are clear, especially at low similarity thresholds.

For example, in FIG. 5(a) we see that CB precision varies between nearly 28% (at k=5 and for a similarity threshold>0) to 11% (at k=30 for the same threshold). This is compared to precision values of between 17% and 3% for I-SPY, and values between 12% and 3% for Meta. These results indicate that CB benefits from a precision improvement of between 60% and 258%, relative to I-SPY at the similarity threshold>0 level; similar benefits are indicated for a similarity threshold>0.25. These precision improvements are even greater (between 130% and 265%) when measured relative to Meta.

The recall results tell a similar story. The recall for CB (at similarity thresholds of >0 and >0.25) grows from approximately 37% (k=5) to just over 91% (k=30). At the same result-list sizes I-SPY's recall only grows from 23% to 25% and Meta's recall, from 16% to 25%. Obviously the CB method is locating a far greater portion of the relevant pages than I-SPY or Meta and it is gaining access to these additional relevant pages from the result-lists of its similar queries.

Once again we see that the CB benefits tend to fall away as the similarity threshold increases, and for thresholds>0.5 and beyond only minor precision and recall improvements are achieved (in the order of 7-12%). As discussed in the previous section, this can be readily explained by the sharp drop in similar cases for similarity thresholds of 0.5 and higher.

Additional Processing

The meta engine 1 uses relevance as its primary metric for ranking results. In one embodiment, the value of a result comes from a single row of the hit-matrix, and in another it uses a weighted relevance metric that combines the individual relevance score that a page might have for multiple related queries.

It is possible to combine relevance with other result-ranking page metrics. For example, if the meta engine were incorporated into a search engine it could combine the relevance of a page with the search engine's scoring function. For example, it could compute the average of the two scores and multiply the score together. In short a range of combination methods could be used.

Most commercial search engines present two types of results to a user based on their query: regular results (normal results that have been found because they share terms in common with the query) and sponsored results or paid listings. Sponsored results (or paid listings) are returned not because they necessarily contain terms that match the users query but rather because some organization has essentially purchased the query term.

Moreover, many search engines operate a query auction so that interested parties bid for query terms, with the highest bidder appearing higher up in the sponsored results list. XYZ Cars Inc. might pay a sum per click for the query "XYZ". This means that if a user searches for "XYZ" and they select the XYZ Cars Inc. sponsored link then XYZ Cars Inc. will pay $5 to the search engine organisation. Another related business (www.used-cars.com, for example) might only bid a smaller sum for the "XYZ" query and so they would be placed lower down in the sponsored listings.

The system's relevance score of a sponsored link, for a particular query, can be combined with the bid-value of a query term to deliver increased revenue to a search engine. To do this the system would devote a separate hit-matrix to cover the selection of sponsored links for specific queries. Accordingly it could compute a new ranking score for a sponsored link, relative to a query, by combining the value bid by the sponsored link owner for the query with the relevance of the sponsored link for that query. The relevance is an estimate of the probability that that sponsored link will be selected for that query based on its past selections for this, and related, queries. If the system combines these two scores (bid value and relevance) by multiplying them then it will be ordering the sponsored links by the "expected pay out"—and estimate of the amount of revenue that the search engine can expect to get from the link for the query.

For example, suppose that XYZ Cars Inc. bid $5 for "XYZ" and used-cars.com bid $3 and suppose that the relevance value for the XYZ Cars Inc. sponsored link is 0.1 (indicating that 10% of the times that "XYZ" or related queries have been submitted this sponsored link has been selected). Suppose also that used-cars.com has a relevance of 0.2. Then the overall score for XYZ Cars Inc. is 0.5 (5×0.1) and the score for used-cars.com is 0.6 (3×0.2). This suggests that used-cars.com should appear first. Even though it has a lower bid price, it is more likely to be accepted and thus will generate more revenue for the search engine. This scheme presents a number of advantages for all parties concerned:

1. The search engine generates more revenue by using the expected payout as a ranking function for its sponsored listings.

2. End users benefit because they see more relevant sponsored links first, rather than companies who are simply paying more for queries.

This approach to sponsored-link ranking represents a significant improvement over existing approaches. In our approach we maintain different selection frequencies for each individual query that a link has been selected to allow us to provide a far more accurate ranking. In addition, our relevancy metric makes it possible to leverage the selection history information of related queries, not just an individual query. This is very advantageous in Web search as many modifications of queries are possible, and so relying solely on the reuse of selection information at the level of an individual query, is likely to prove limited if few examples of that exact query have occurred in the past.

We now will describe another embodiment. We have already indicated that our search engine maintains different hit matrices for different communities of individuals/searchers and how these communities can be ad-hoc or well-defined communities. For example, one community might be ad-hoc in the sense that it consists of all users that have submitted search queries through a particular Web page—say on a motoring portal—these queries having been linked to a specific hit-matrix for that portal. Another community might be more formally defined by creating a specific search engine for a particular club and offering club-members access through a designated URL; again the searches by this club are directed to a specific hit-matrix. Indeed an individual user may utilise their own personal hit-matrix, which then tracks their individual searching behaviour. The point is that there is a multiplicity of hit-matrices, each devoted to the search histories of different groups of users. In another embodiment, a query submitted by a user to one particular search service (associated with one particular hit-matrix) may benefit from the information stored by other hit-matrices. In what follows we shall provide two examples of this.

In the first example the search engine runs a form of "meta meta-search". When a user submits a new query, q, to one particular search service and hit-matrix, s, the same query can be automatically submitted to all other search services. The main results from the primary search service, s, are presented to the user as described above, but in addition results from related search services can also be presented as secondary results. For example, consider our user submitting the query "XYZ" through a motoring site. This will cause the retrieval of a set of results that are likely to be related to cars, by virtue of the hit-matrix that has been learned from previous searches through this site. Suppose that there are other hit-matrices available, one for a wildlife site and one for a computer fan-club site. These hit-matrices are likely to also have results that have been previously selected for the query "XYZ"-the former related to wild life and the latter to an operating system and these secondary results can be highlighted to the user of the motoring site just in case they happen to be looking for non-motoring results. The point is that there may be other communities of searchers who have built up hit matrices that may be relevant to the current search and that by presenting their top search results, along with information about the community, we may be able to further help the user. In our invention each hit-matrix service is a usage-based cluster of results that may provide a more practical approach to results clustering. For instance, prior approaches to clustering are computationally very expensive, as search results must be analysed (the contents of each page must be compared to the contents of other pages retrieved by the search) in real-time before clusters can be determined. Our hit-matrices serve as a type of cluster-cache and the clustering effect can be delivered without the need for computationally expensive page analysis.

Our second example is best explained by considering the possibility that a user might not know which search service to use for their search. Accordingly we provide a central search engine, which is not necessarily associated with any well-defined community of users. When a query is submitted this engine submits the query to each of its hit-matrices and the results from each hit-matrix are returned to the user, ranked according to their relevancy within each hit-matrix, and labelled by the appropriate hit-matrix label; thus the results are returned in a set of clusters as contemplated in the previous paragraph. However in addition the engine can use various metrics to identify which hit-matrix is likely to be the best provider of results for the particular query and in this way we can rank order the individual clusters (as well as the results in the clusters) according to the ability to satisfy the query. To do this the system computes the degree to which a specific query, $q_T$, is related to a given hit-matrix, H. One way is to compare $q_T$ to each of the queries stored in H to look for related queries; that is queries with a non-zero similarity to $q_T$; for example, a similarity metric such as that used in Equation 6 can be used. For each of these related queries we can compute a success score. The success score for a query in a hit-matrix is the relative number of hits (selections) that it has contained within its matrix entry, compared to the total number of hits in that hit-matrix; see Equation 8. This metric will deliver high success scores to queries that have resulted in lots of page selections.

$$\text{Success}(q_c, H) = \frac{\sum_{\forall i} H_{ci}}{\sum_{\forall ij} H_{ij}} \tag{8}$$

And then the degree to which $q_T$ is related to H can be computed as the sum of the success scores for each similar query weighted by the degree of similarity; see Equation 9.

$$\text{Related}(q_T, H) = \sum_{\forall q_c \in H} \text{Sim}(q_T, q_c) \cdot \text{Success}(q_c, H) \tag{9}$$

In this way, a hit-matrix will be considered to be related to a target query if it contains lots of similar queries and if these similar queries have been very successful (users have selected their results frequently) in the past. This allows hit-matrices to be dynamically selected and ranked prior to search.

It will thus be appreciated that the invention provides for much more efficient information retrieval. For example, each cell of the hit-matrix could contain a different type of "relevancy" information. It might not be a simple count of the number of times a page has been selected. For example, it is envisaged that these hit values would decay over time so that old pages (with lots of hits) would not be unfairly preferred over newer pages.

The invention is not limited to the embodiments described but may be varied in construction and detail. For example, the meta search engine of the invention may be incorporated in a search engine, performing the post-processing internally within the search engine. The term "matrix" is to be interpreted to mean any memory structure which correlates data in two or more dimensions with values.

The invention claimed is:

1. An information retrieval method carried out by a meta search engine communicating with n underlying search engines $S_1$ through $S_n$ via n associated adapters, the method comprising the steps of:

the meta search engine receiving a query $q_T$ from a user;

the adapters transforming the query $q_T$ received by the meta search engine into queries $q_1$ through $q_n$ in the formats of the associated underlying search engines $S_1$ through $S_n$ and submitting the queries $q_1$ through $q_n$ to the underlying search engines $S_1$ through $S_n$;

the underlying search engines $S_1$ through $S_n$ performing searches for the corresponding queries $q_1$ through $q_n$ to provide n corresponding result lists $R_1$ through $R_n$, and returning the result lists $R_1$ through $R_n$ to the adapters, wherein each of the result lists $R_1$ through $R_n$ consists of a plurality of results, the adapters reformatting the result lists $R_1$ through $R_n$ as result lists $R'_1$ through $R'_n$ and returning the result lists $R'_1$ through $R'_n$ to the meta search engine, wherein each of the result lists $R'_1$ through $R'_n$ consists of a plurality of results;

the meta search engine merging the result lists $R'_1$ through $R'_n$ to provide a result list R' of ranked results;

the meta search engine performing relevancy processing in a manner which does not employ user-specific information, using at least one hit matrix H having in one dimension Web pages p historically selected by a community of users operating within a specific domain of interest and in another dimension query strings q from the same community of users as selected the Web pages p, wherein the value $H_{ij}$ in each cell indicates the number of times a particular Web page $p_j$ has been previously selected by a user in response to a particular query string $q_i$, to provide a second result list R" of particular Web pages $p_j$ selected in response to a particular query string $q_i$ identical or related to the query $q_T$, the corresponding cells for which have a value $H_{ij}$ that is non-zero;

the meta search engine performing post-processing of the result list R' in a manner which does not employ user-specific information, the post-processing including the steps of the meta search engine:

merging the result lists R' and R" to provide a merged result list R; and providing the merged result list R to the user as a response to the query $q_T$.

2. The method as claimed in claim 1, wherein the relevancy processing is performed in parallel with searching by the underlying search engines.

3. The method as claimed in claim 1, wherein the relevancy processing comprises computing the hit number for each result $p_j$ for the query $q_i$ relative to a total of the hit numbers for the query $q_i$ to provide a relevance score for each result $p_j$, and ranking the results according to said relevancy scores.

4. The method as claimed in claim 3, wherein the meta search engine combines the relevance score with another score.

5. The method as claimed in claim 3, wherein the meta search engine combines the relevance score with a sponsored listing score ranking score.

6. The method as claimed in claim 1, wherein the merging step comprises giving higher preference to results from the second result list R" and avoiding duplicates.

7. The method as claimed in claim 1, wherein the meta search engine dynamically selects from a plurality of hit matrices.

8. The method as claimed in claim 1, wherein the meta search engine dynamically selects from a plurality of hit matrices, and performs the selection according to a community to which the user is allocated.

9. The method as claimed in claim 8, wherein the community to which the user is allocated is determined according to source of the query.

10. The method as claimed in claim 8, wherein a Web site from which the query originates is used to determine the community to which the user is allocated.

11. The method as claimed in claim 8, wherein the user results R are presented by the meta search engine together with information about the community associated with the selected hit matrix.

12. The method as claimed in claim 11, wherein the results are presented in usage-based clusters.

13. The method as claimed in claim 1, wherein the meta search engine selects a plurality of hit matrices and firstly presents to the user results arising from relevancy processing and merging with a primary hit matrix.

14. The method as claimed in claim 1, wherein the meta search engine applies weightings to the results $p_j$ of the hit matrix according to similarity of the current query $q_T$ with the associated query strings.

15. The method as claimed in claim 14, wherein the similarity is determined according to extent of query word overlap.

16. The method as claimed in claim 1, wherein the meta search engine performs case based reasoning in which each case comprises a query string and k associated historical results forming k pairs, each pair having an identifier and a relevance score.

17. The method as claimed in claim 16, wherein each case corresponds to a dimension of a hit matrix.

18. The method as claimed in claim 1,
wherein the meta search engine dynamically selects from a plurality of hit matrices H, and performs the selection according to a community to which the user is allocated;
wherein the community to which the user is allocated is determined according to source of the query; and
wherein a Web site from which the query originates is used to determine the community to which the user is allocated.

19. A computer program product, comprising a computer readable medium having a computer readable program code embodied therein, said computer readable program code adapted to implement the steps performed by the meta search engine in the method of claim 1 when executing on a digital processor.

* * * * *

UNITED STATES PATENT AND TRADEMARK OFFICE
CERTIFICATE OF CORRECTION

PATENT NO. : 7,599,928 B2  Page 1 of 1
APPLICATION NO. : 11/334753
DATED : October 6, 2009
INVENTOR(S) : Smyth et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 266 days.

Signed and Sealed this

Twenty-eighth Day of September, 2010

David J. Kappos
*Director of the United States Patent and Trademark Office*